US011200544B2

(12) United States Patent
Bullock et al.

(10) Patent No.: US 11,200,544 B2
(45) Date of Patent: Dec. 14, 2021

(54) INTERVAL RATIONALIZATION FOR COMPLETED MAINTENANCE SERVICES

(71) Applicant: Caterpillar Inc., Peoria, IL (US)

(72) Inventors: Robert Bullock, Germantown Hills, IL (US); Nicholas Redd, East Peoria, IL (US)

(73) Assignee: Caterpillar Inc., Peoria, IL (US)

(*) Notice: Subject to any disclaimer, the term of this patent is extended or adjusted under 35 U.S.C. 154(b) by 915 days.

(21) Appl. No.: 14/871,374

(22) Filed: Sep. 30, 2015

(65) Prior Publication Data

US 2017/0091718 A1 Mar. 30, 2017

(51) Int. Cl.
*G06Q 10/10* (2012.01)
*G07C 5/02* (2006.01)
(Continued)

(52) U.S. Cl.
CPC ... *G06Q 10/1097* (2013.01); *G06Q 10/06312* (2013.01); *G06Q 10/20* (2013.01);
(Continued)

(58) Field of Classification Search
CPC .............................. G06Q 50/02; G06Q 10/20
See application file for complete search history.

(56) References Cited

U.S. PATENT DOCUMENTS 6,047,260 A * 4/2000 Levinson ....... G06Q 10/063114
705/7.15
6,216,109 B1 * 4/2001 Zweben ............. G06Q 10/0631
705/7.12

(Continued)

FOREIGN PATENT DOCUMENTS

CA     2389274 C  *  2/2007  .......... G06F 11/2257

OTHER PUBLICATIONS

J. Brown and B. J. McCarragher, "Maintenance resource allocation using decentralised co-operative control," 1999 Information, Decision and Control. Data and Information Fusion Symposium, Proceedings (Cat. No. 99EX251), pp. 41-46, doi: 10.1109/IDC.1999.754124. (Year: 1999).*

(Continued)

*Primary Examiner* — Shelby A Turner
(74) *Attorney, Agent, or Firm* — Oblon, McClelland, Maier & Neustadt

(57) ABSTRACT

A computing device for scheduling maintenance services for an earthmoving machine is disclosed. The computing device includes an input device configured to receive work hour input associated with work operations of the earthmoving machine and a visual display on board the earthmoving machine. The computing device further includes a processor configured to execute instructions for receiving the work hour input from the input device and determining current work hours associated with a completed maintenance service of the earthmoving machine based on the work hour input. The processor is further configured to execute instructions for presenting a user of the earthmoving machine, via the visual display, with one or more service interval rationalization options based on the current work hours and scheduling one or more subsequent planned maintenance services based on the one or more service interval rationalization options.

20 Claims, 9 Drawing Sheets

(51) Int. Cl.
  *G07C 5/08* (2006.01)
  *G06Q 10/00* (2012.01)
  *G06Q 50/02* (2012.01)
  *G06Q 10/06* (2012.01)

(52) U.S. Cl.
  CPC .............. *G06Q 50/02* (2013.01); *G07C 5/02* (2013.01); *G07C 5/08* (2013.01)

(56) References Cited

U.S. PATENT DOCUMENTS

| | | | | |
|---|---|---|---|---|
| 6,505,106 B1* | 1/2003 | Lawrence | ............. | G01M 15/05 |
| | | | | 342/357.31 |
| 6,606,546 B2* | 8/2003 | Sinex | ............... | G06Q 50/12 |
| | | | | 701/32.7 |
| 6,651,001 B2 | 11/2003 | Apsell | | |
| 6,876,908 B2* | 4/2005 | Cramer | ............... | G06Q 10/06 |
| | | | | 701/29.3 |
| 6,970,857 B2* | 11/2005 | Card | ............... | G05B 13/027 |
| | | | | 700/173 |
| 7,860,738 B2* | 12/2010 | Simon | ............. | G06Q 10/06315 |
| | | | | 705/7.13 |
| 8,065,342 B1* | 11/2011 | Borg | ............... | G06Q 10/0631 |
| | | | | 707/803 |
| 8,560,160 B2* | 10/2013 | Holzer | ............... | G05B 19/4184 |
| | | | | 701/29.4 |
| 9,014,876 B2 | 4/2015 | Mason et al. | | |
| 9,041,561 B2 | 5/2015 | Wallace | | |
| 9,975,172 B2* | 5/2018 | Galt | ............ | B22D 17/32 |
| 2002/0073012 A1* | 6/2002 | Lowell | ............... | G06Q 40/04 |
| | | | | 705/37 |
| 2002/0156558 A1* | 10/2002 | Hanson | ............... | G07C 5/008 |
| | | | | 701/29.3 |
| 2003/0055666 A1* | 3/2003 | Roddy | ............. | G06Q 10/06395 |
| | | | | 705/305 |
| 2003/0130989 A1* | 7/2003 | Kaufman | ............... | G06Q 30/02 |
| 2003/0171965 A1* | 9/2003 | Ratzlaff | ............... | G06Q 10/109 |
| | | | | 705/7.18 |
| 2004/0073468 A1* | 4/2004 | Vyas | ............... | G06Q 10/0639 |
| | | | | 705/7.13 |
| 2005/0021359 A1* | 1/2005 | McKinney | ............. | G06Q 50/06 |
| | | | | 705/7.11 |
| 2005/0090951 A1 | 4/2005 | Good | | |
| 2006/0224430 A1* | 10/2006 | Butt | ............... | G06Q 10/063116 |
| | | | | 705/7.16 |
| 2009/0003138 A1* | 1/2009 | Donnelli | ............... | G07C 5/085 |
| | | | | 368/28 |
| 2009/0005927 A1 | 1/2009 | Schlatre | | |
| 2009/0106036 A1* | 4/2009 | Tamura | ............... | G06Q 10/20 |
| | | | | 705/305 |
| 2009/0199192 A1* | 8/2009 | Laithwaite | ............. | G06Q 10/06 |
| | | | | 718/104 |
| 2012/0123951 A1* | 5/2012 | Hyatt | ............... | G06Q 10/10 |
| | | | | 705/305 |
| 2013/0073329 A1* | 3/2013 | Shoham | ............... | G06Q 10/10 |
| | | | | 705/7.18 |
| 2013/0191836 A1* | 7/2013 | Meyer | ............... | G06F 9/4881 |
| | | | | 718/103 |
| 2013/0325541 A1* | 12/2013 | Capriotti | ............... | G06Q 10/087 |
| | | | | 705/7.21 |
| 2014/0156035 A1* | 6/2014 | Groschen | ............ | G06Q 10/06312 |
| | | | | 700/90 |
| 2014/0188999 A1* | 7/2014 | Leonard | ............... | H04L 12/1859 |
| | | | | 709/204 |
| 2014/0229391 A1* | 8/2014 | East, III | ............... | G06Q 10/20 |
| | | | | 705/305 |
| 2014/0324456 A1* | 10/2014 | Frohliger | ............... | G16H 40/20 |
| | | | | 705/3 |
| 2015/0057875 A1* | 2/2015 | McGinnis | ............ | G07C 5/0841 |
| | | | | 701/31.6 |
| 2015/0134312 A1* | 5/2015 | Dasgupta | ............... | H04L 41/145 |
| | | | | 703/6 |
| 2016/0342957 A1* | 11/2016 | Sloup | ............... | G06Q 30/0226 |
| 2017/0068239 A1* | 3/2017 | Maenishi | ........... | G05B 19/4188 |
| 2017/0154394 A1* | 6/2017 | Kan | ............... | G06Q 50/28 |
| 2018/0080305 A1* | 3/2018 | Jacks | ............... | G05B 19/02 |

OTHER PUBLICATIONS

A. B. M. R. Islam et al., "Efficient black-box maintenance scheduler and rescue system," The 2nd International Conference on Next Generation Information Technology, pp. 159-162. (Year: 2011).*

* cited by examiner

INTERVAL RATIONALIZATION FOR COMPLETED MAINTENANCE SERVICES

TECHNICAL FIELD OF THE DISCLOSURE

The present disclosure generally relates to earthmoving machines and, more particularly, relates to systems and methods for scheduling maintenance for earthmoving machines.

BACKGROUND OF THE DISCLOSURE

Heavy machines, such as earthmoving machines, mining trucks, and the like, require regular maintenance to ensure that the machines are operating correctly and to preserve the working life of the machines. Regular maintenance of heavy machines may be pre-planned as planned maintenances services. Examples of planned maintenance services include, but are not limited to including, oil changes, coolant level checks, coolant replenishment, hydraulic inspections, filter inspections, and the like. A manufacturer may provide an operator of such a machine with a timeline for these planned maintenance services, so that the operator knows when to have planned maintenance services performed to preserve the working life of the machine.

To adequately plan a timeline for these planned maintenance services, the regular maintenance may be planned in advance, wherein the planning of the maintenance is based on working hours. Working hours for a machine may be any amount of time, measured by the hour and fractions thereof, when the machine is in operation. Alternatively or consecutively, working days may be tracked, based on an average number of working hours per day. Working hours may be tracked by sensors associated with the machine, by human observation of the machine combined with manual tracking, or any other system or method for tracking working hours. Once tabulated, the manufacturer may use working hours and/or working days as measurement units for the passage of time on a planned maintenance service schedule that is provided to the operator of the machine.

Manufacturers often use various systems and methods for tracking service hours in relation to machine health (e.g., faults detected, oil level, etc.), such as the systems and methods disclosed in U.S. Patent Publication No. 2004/0073468. In the '468 disclosure, certain data associated with the machine, such as product watch data, fault code data, scheduled oil sample data, and the like, is used for determining work hours, which may, thereafter, be used in scheduling services.

However, while service hours in relation to machine health have, generally, been tracked and used in scheduling planned maintenance, a need exists to alter a schedule based on early or late performance of a planned maintenance service. Therefore, to account for early or late performance of planned maintenance services, systems and methods for planning maintenance of a machine, which account for early or late performance of planned maintenance services, are desired.

SUMMARY OF THE DISCLOSURE

In accordance with one aspect of the present disclosure, computing device configured for scheduling maintenance for an earthmoving machine is disclosed. The computing device may include an input device configured to receive work hour input associated with work operations of the earthmoving machine and a visual display on board the earthmoving machine. The computing device may further include a processor in communication with, at least, the input device and the visual display, and configured to execute instructions for receiving the work hour input from the input device and determining current work hours associated with a completed maintenance service of the earthmoving machine based on the work hour input. The processor may further be configured to execute instructions for presenting a user of the earthmoving machine, via the visual display, with one or more service interval rationalization options based on the current work hours; and scheduling one or more subsequent planned maintenance services based on the one or more service interval rationalization options.

In accordance with another aspect of the disclosure, a system for scheduling maintenance for an earthmoving machine is disclosed. The system may include an earthmoving machine, a telematics device configured to receive work hour input associated with work operations of the earthmoving machine, and a computing device. The computing device may include a visual display, a processor in communication with, at least, the telematics device and the visual display. The processor may be configured to execute instructions for receiving the work hour input from the input device, determining current work hours associated with a completed maintenance service of the earthmoving machine based on the work hour input, presenting a user of the earthmoving machine, via the visual display, with one or more service interval rationalization options based on the current work hours, and scheduling one or more subsequent planned maintenance services based on the one or more service interval rationalization options.

In accordance with yet another aspect of the disclosure, a method for scheduling maintenance for an earthmoving machine is disclosed. The method may include receiving work input data from a telematics device associated with the earthmoving machine and electronically determining current work hours associated with a completed maintenance service of the earthmoving machine based on the work input data using an electronic computing device. The method may further include electronically comparing the current work hours with a first work hour threshold associated with a first planned maintenance service using the electronic computing device and electronically determining if the current work hours are less than the first work hour threshold using the electronic computing device. The method may further include presenting a user of the earthmoving machine with one or more service interval rationalization options using a display provided onboard the earthmoving machine and scheduling one or more subsequent planned maintenance services based on the one or more service interval rationalization options using the electronic computing device.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION OF THE DISCLOSURE

Figure 1:
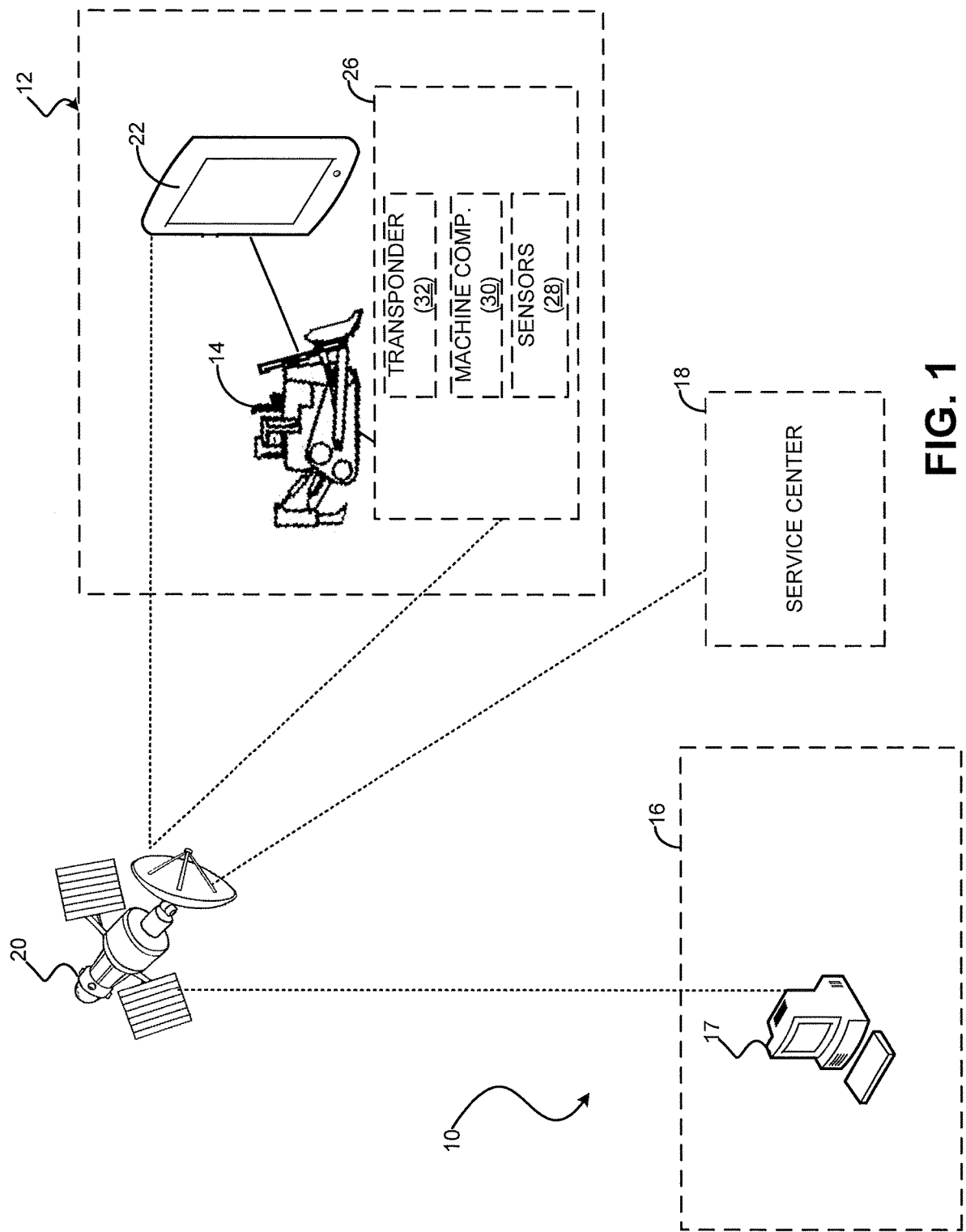
FIG. 1 is a schematic diagram of an example system for communication amongst an operator of an earthmoving machine, a manufacturer of the earthmoving machine, and a service center for performing maintenance services on the earthmoving machine, in accordance with one aspect of the disclosure.
Figure 2:
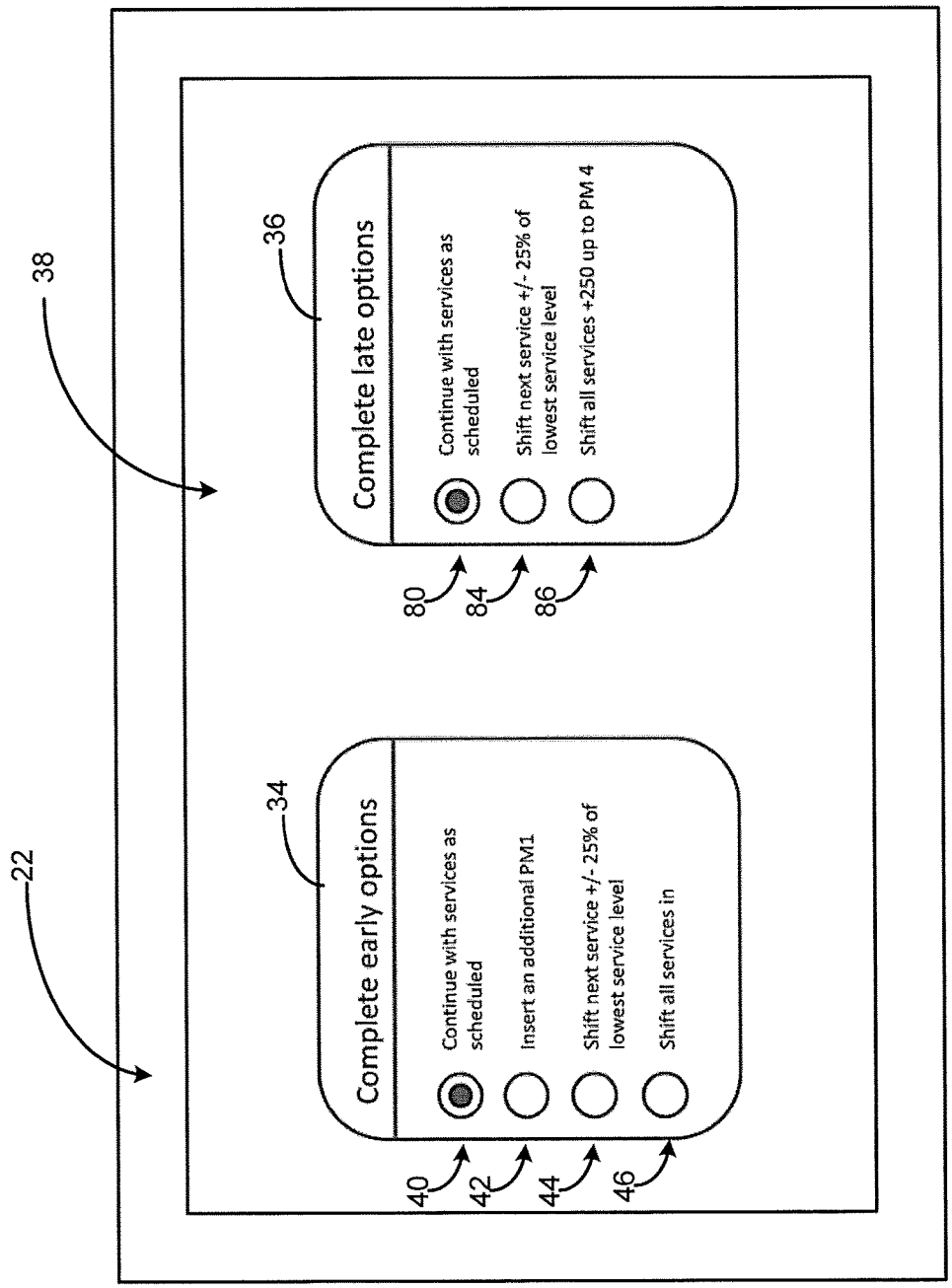
FIG. 2 is a simplified side view of a computing device configured for scheduling maintenance for an earthmoving machine, the computing device having a visual display for presenting a user with interval rationalization options, in accordance with an embodiment of the disclosure.

Turning now to the drawings and with specific reference to FIG. 1, a system 10 for communication amongst an operator site 12 for an earthmoving machine 14, a manufacturer site 16, and a service center 18 is illustrated schematically. Communication throughout the system 10 may be accomplished via a network 20, wherein the communicative links amongst the elements in FIG. 1 are depicted as dotted lines. The network 20 may be any non-wired network such as the Internet, a WLAN, a WAN, a personal network, or any other network for connecting any computing devices associated with any of the operator site 12, the manufacturer site 16, and the service center 18 to each other and/or to any other controller or capable computing device.

The earthmoving machine 14, prior to being used for work at the operator site 12, is manufactured at the manufacturer site 16, wherein information regarding specific details of the earthmoving machine 14 may be recorded and/or stored in, for example, a manufacturing database 17, which may be any suitable computing device for storing machine data. Although the earthmoving machine 14 is illustrated as a wheel loader, the earthmoving machine 14 may be of any other type. As used herein, the term "earthmoving machine" refers to a mobile machine that performs driven operation involving physical movement associated with a particular industry, such as, construction, landscaping, mining, forestry, transportation, agriculture, etc. Non-limiting examples of earthmoving machines include commercial and industrial machines, such as, loaders, excavators, dozers, motor graders, tractors, trucks, backhoes, mining vehicles, on-highway vehicles, trains, agricultural equipment, material handling equipment, and other types of machines that operate in a work environment.

After it is manufactured at the manufacturer site 16, the earthmoving machine 14 is present at the operator site 12, at which the earthmoving machine 14 may perform work on the operator site 12. "Work" of the earthmoving machine 14 may be defined as any time when the earthmoving machine 14 is in operation. Work of the earthmoving machine 14 may be tracked as working hours and/or as work days. Working hours for a machine may be any amount of time, measured by the hour and fractions thereof, when the machine is in operation. Alternatively or consecutively, working days may be tracked, based on an average number of working hours per day. Working hours may be tracked by sensors associated with the machine, by human observation of the machine combined with manual tracking, or any other system or method for tracking working hours.

To assist in tracking working hours of the earthmoving machine 14 and to plan maintenance schedules for the earthmoving machine 14, a computing device 22 may be used at the operator site 12. The computing device 22 may be, for example, a mobile device, a tablet computer, a cellular phone, a laptop computer, a server, a personal computer, or any other type of computing device. The computing device 22 may be configured to communicate with computing devices associated with one or both of the manufacturer site 16 and the service center 18. Working hours may be manually entered in to the computing device 22 by, for example, an operator 24. Additionally or alternatively, working hours may be tracked and communicated to the computing device 22 via a telematics system 26 that is operatively associated with the earthmoving machine 14.

An example of the telematics system 26 is depicted schematically in FIG. 1. The telematics system 26 may include a plurality of sensors 28 configured to provide information about the earthmoving machine 14 to an onboard computer 30. This information may then be transmitted to the computing device 22, or any other computing device requesting information about the earthmoving machine 14, via a wireless network link 32.

The telematics system 26 uses the sensors 28, which may be, for example, any electronic, electromechanical, and/or electromagnetic devices operating in conjunction with particular aspects and/or parts of the earthmoving machine 14, to intelligently track operation of the earthmoving machine 14. While, for the purposes of this disclosure, the telematics data provided by the telematics system 26 is configured to collect data for determining working hours, such data may additionally or alternatively be used for safety and commercial communications between the earthmoving machine 14 and any of the computing device 22, the service center 18, and the manufacturer site 16. In fact, the telematics data may be particularly useful for determining scheduling guidelines for planned maintenance by the manufacturing database 17.

Figure 3:
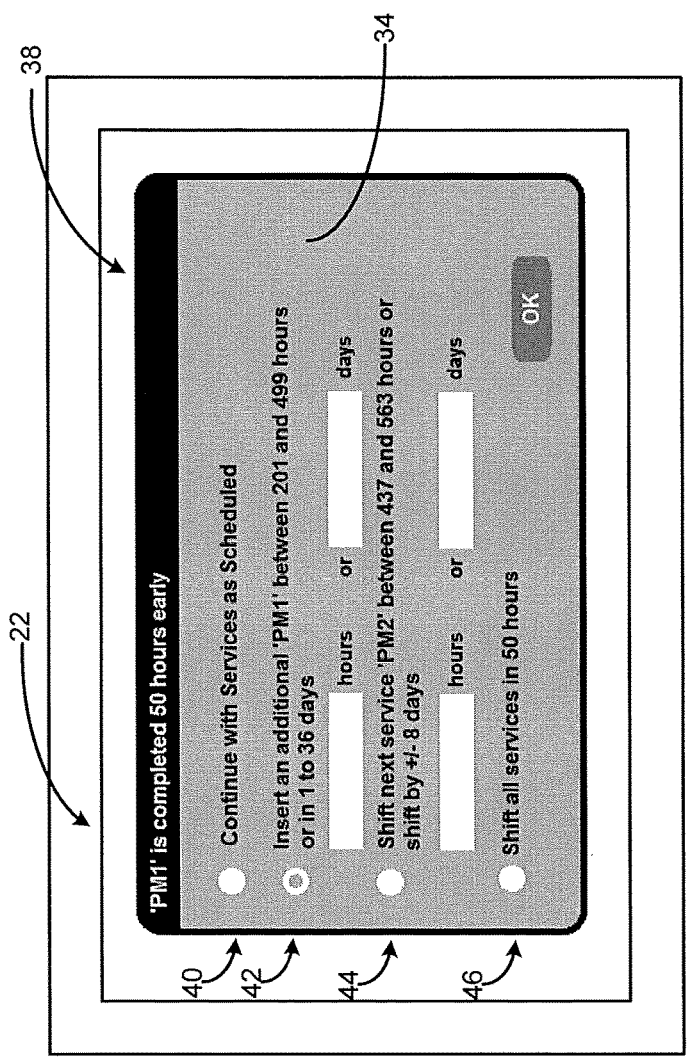
FIG. 3 is another simplified side view of the computing device of FIG. 2, wherein the computing device is configured to utilize an addition option of the interval rationalization options, in accordance with an embodiment of the disclosure.

Using such data provide, either manually by the operator 24 or via the telematics system 26, the computing device 22 can be configured to schedule maintenance for the earthmoving machine 14. Turning to FIG. 3, the computing device 22 is shown in a simplified side view, wherein the device is executing instructions for scheduling planned maintenance procedures for the earthmoving machine 14. The manufacturer site 16 may provide the operator 24 with a predetermined schedule for a variety of planned maintenance services, to which the operator 24 is encouraged to follow so that the earthmoving machine 14 operates correctly and remains usable for the longest possible time period. While the operator 24 may try to have the planned maintenance services performed at the suggested times, often, the operator 24 has a first planned maintenance service performed either early or late. Therefore, as shown, the computing device 22 is configured to present the operator 24 with one or both of early service interval rationalization options 34 and late service interval rationalization options 36 on a visual display 38 of the computing device 22. By employing either the early service interval rationalization options 34 or the late service interval rationalization options 36, the timeline of the scheduling of the planned maintenance services may be altered.

Beginning with the early service interval rationalization options 34, such options may include, but are not limited to including, a continuation option 40, a service addition option 42, a shift next service option 44, and a shift all service option 46. The continuation option 40 may be employed to maintain the original schedule for the planned maintenance of the earthmoving machine 14, regardless of whether or not a first planned maintenance service was completed ahead of schedule.

Figure 4:
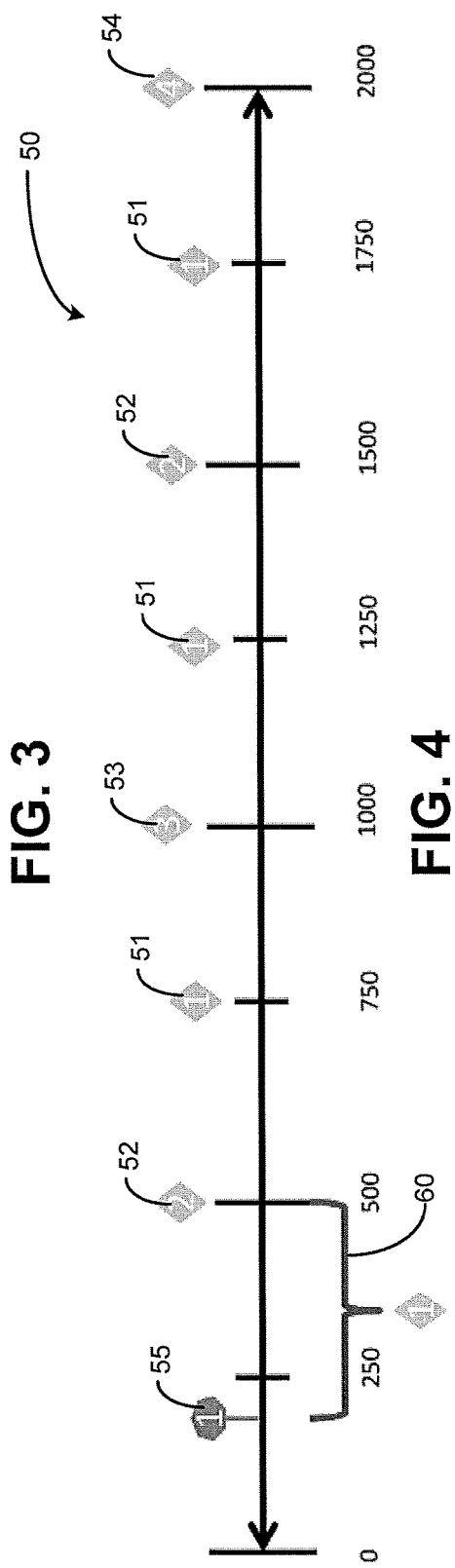
FIG. 4 is an example timeline for planned maintenance services for an earthmoving machine, wherein settings for the addition option are shown, in accordance with FIG. 3 and the present disclosure.

FIG. 3 is another simplified side view of the computing device 22, in which the service addition option 42 is utilized. A preplanned timeline 50 is shown in FIG. 4, which may be altered based on the shift next service option 44. The example preplanned timeline 50 includes a plurality of first planned maintenance services ("PM1") 51, second planned maintenance services ("PM2"), third planned maintenance services ("PM3"), and fourth planned maintenance services ("PM4"). The example preplanned timeline 50, each PM1 51 is scheduled for every 250 work hours of the earthmoving machine 14, each PM2 52 is scheduled for every 500 work hours of the earthmoving machine 14, each PM3 53 is scheduled for every 1000 work hours of the earthmoving machine 14, and each PM4 54 is scheduled for every 2000 work hours of the earthmoving machine 14. As such schedules will overlap, each PM2 52 also includes a PM1 51, each PM3 includes both a PM2 52 and a PM1 51, and each PM4 54 includes all of a PM1 51, a PM2 52, and a PM3 53. While all of the PM1s 51, PM2s 52, and PM3s 53 may be flexibly scheduled using the disclosed systems and methods, in some situations, PM4 54 may be vital to the health of the machine and, therefore, may not be rescheduled.

Of course, while the depicted schedule and corresponding written disclosure, along with the subsequently disclosed shifting intervals, are described using specific numbers of hours, planned maintenance procedures, and timeframes, these quantities are merely exemplary. Therefore, any quantity of time could replace those discussed above, in view of the embodiments of the present disclosure, and such quantities shown and described are certainly non-limiting. Furthermore, the same preplanned timeline 50, having like reference numerals, will be referenced to and altered in view of the embodiments of FIGS. 5-12.

Returning to FIG. 3 and with continued reference to FIG. 4, the computing device 22 is shown utilizing the service addition option 42. If a completed maintenance service 55 is performed early, as shown, then the addition option may be utilized to schedule an additional maintenance service (e.g., an additional PM1 51) within a time range 60 (e.g., the amount of time between the completed maintenance service 55 and the next scheduled planned maintenance on the preplanned timeline 50). The service addition option 42 may be constrained by a time range, as shown as the non-limiting example of a range of 201-499 working hours or 1-36 working days. As mentioned above, working days may be determined by dividing the working hours by a particular number of working hours, on average, completed by the machine in a day. For purposes of example only, in the instant example, one working day is equivalent to 8.33 working hours.

Figure 5:
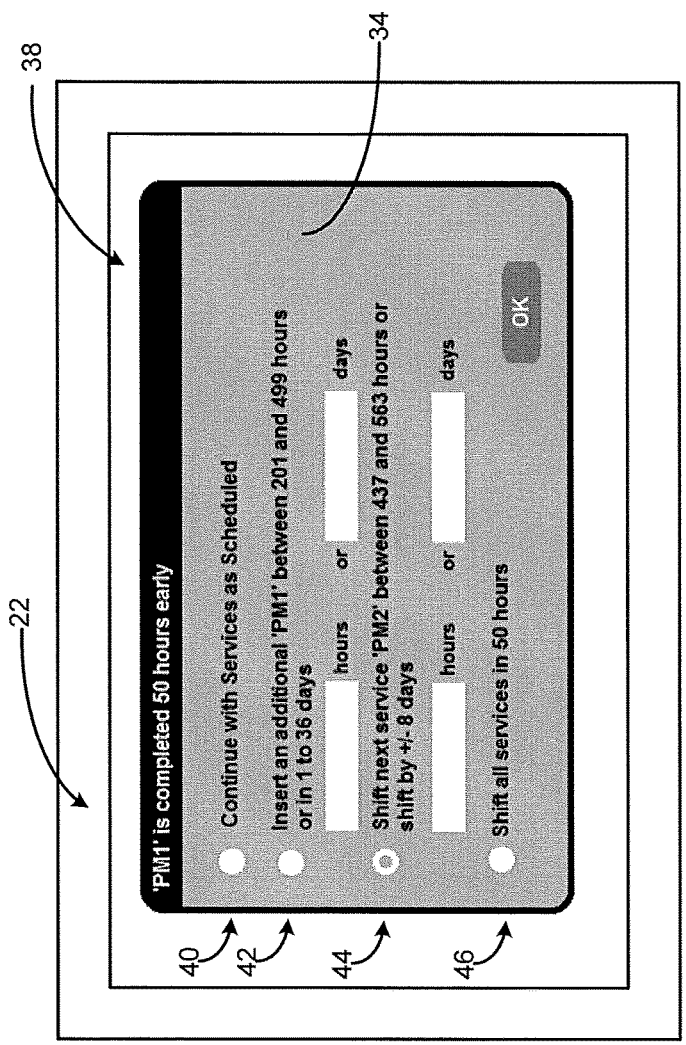
FIG. 5 is another simplified side view of the computing device of FIG. 2, wherein the computing device is configured to utilize a shift next service option of the interval rationalization options, in accordance with an embodiment of the disclosure.
Figure 6:
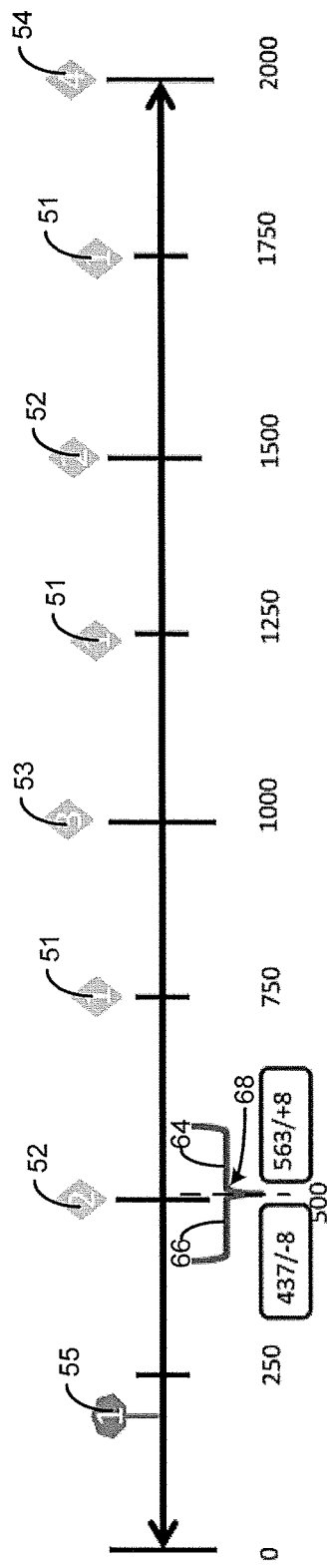
FIG. 6 is an example timeline for planned maintenance services for an earthmoving machine, wherein settings for the shift next service option are shown, in accordance with FIG. 5 and the present disclosure.

Characteristics of the shift next service option 44 are exemplified in the simplified side view of the computing device 22 of FIG. 5 and the corresponding example timeline of FIG. 6. By utilizing the shift next service option 44, the operator 24 is able to shift a subsequent maintenance service 62 (e.g., the PM2 52, as shown) by either a forward shift 64 or a backward shift 66 within a time range 68. The time range 68, in which the subsequent maintenance service 62 may be shifted either forward or backward, may be based on a particular percentage of the time interval between maintenance services. In the given example, the interval between services is 250 working hours and the determined acceptable percentage for shifting is 25% of 250; therefore, the range in which the shift may lie is plus-or-minus 63 working hours of the originally set schedule for the subsequent maintenance service 62. However, these quantities and percentages are merely exemplary and are certainly not limiting.

Figure 7:
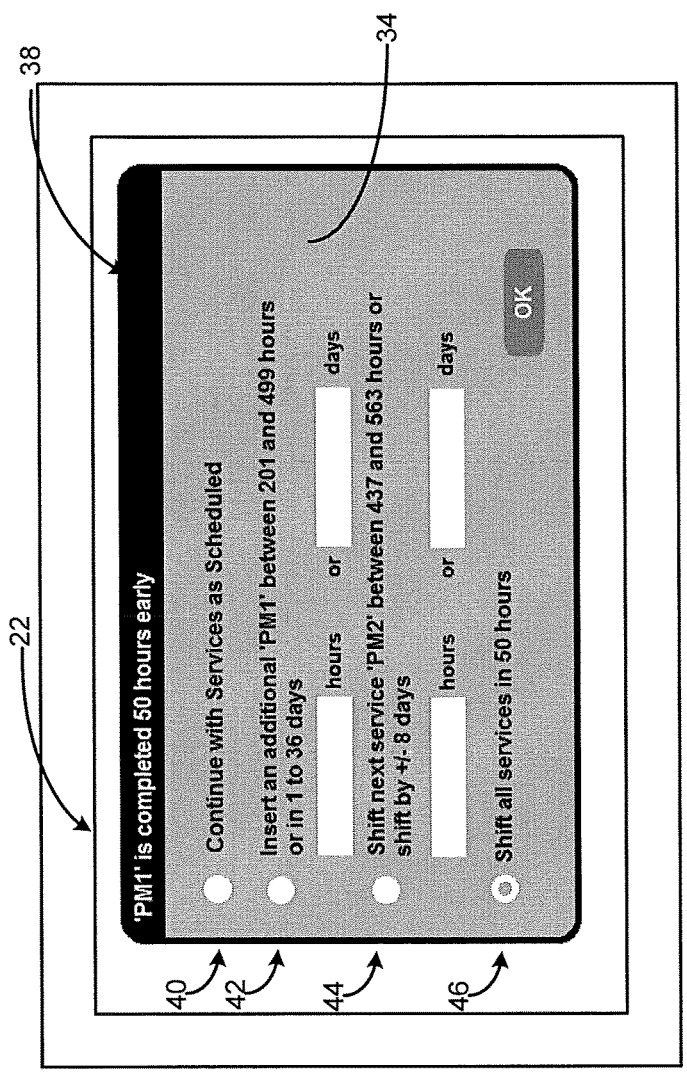
FIG. 7 is another simplified side view of the computing device of FIG. 2, wherein the computing device is configured to utilize a shift all service option of the interval rationalization options, in accordance with an embodiment of the disclosure.
Figure 8:
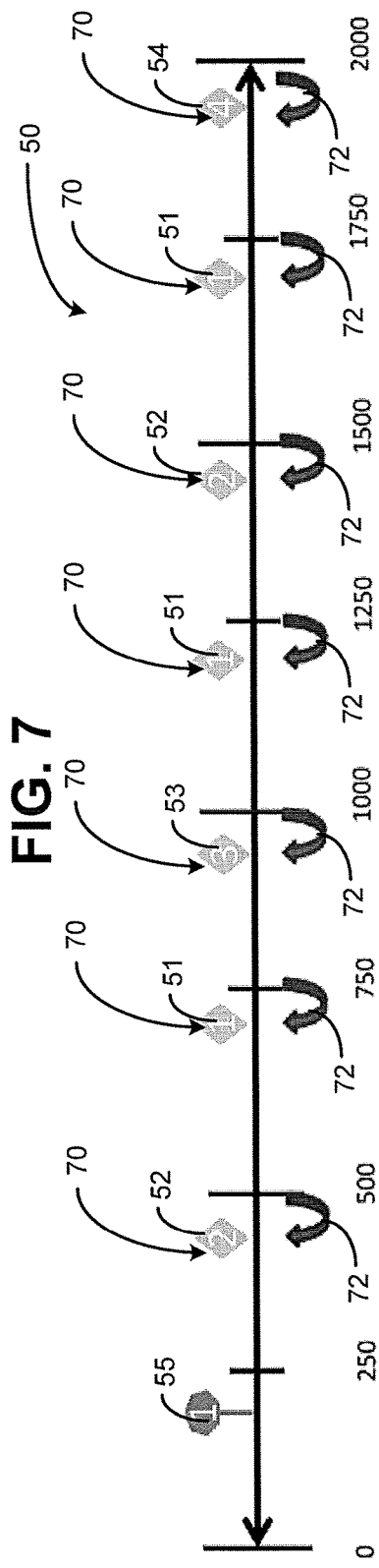
FIG. 8 is an example timeline for planned maintenance services for an earthmoving machine, wherein settings for the shift all service option are shown, in accordance with FIG. 7 and the present disclosure.

FIG. 7 shows another exemplary simplified side view of the computing device 22 and a corresponding example timeline of FIG. 8 illustrates characteristics of the shift all service option 46. Using the shift all service option 46, all subsequent scheduled services 70 (e.g., all PM1s 51, PM2s 52, PM3s 53, and PM4 54, as shown) may be shifted backwards by a predetermined shift 72. The predetermined shift 72 may be shifted based on a specific time range like, for example, 25% of the working hour interval between services.

Returning now to FIG. 3, the late service interval rationalization options 36 are also shown, such options may include, but are not limited to including, a continuation option 80, a shift next service option 84, and a shift all service option 86. As with the above, each of the late service interval rationalization options 36 are described below, in FIGS. 9-12, with continued reference to the preplanned timeline 50. The continuation option 80 may be employed to maintain the original schedule for the planned maintenance of the earthmoving machine 14, regardless of whether or not a first planned maintenance service was completed behind schedule.

Figure 9:
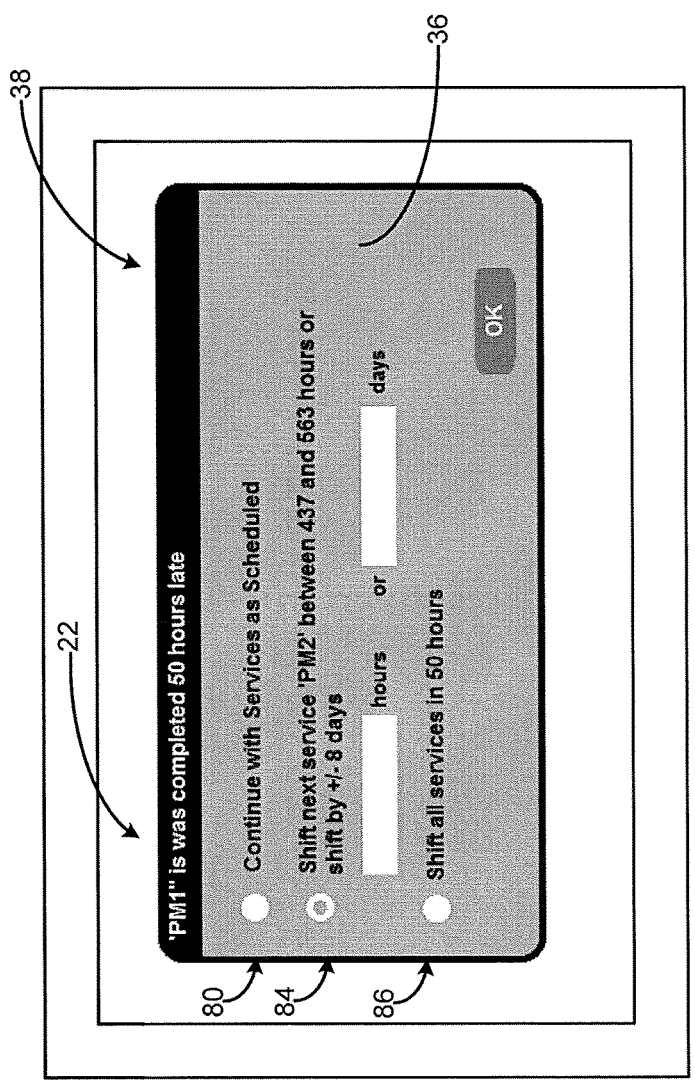
FIG. 9 is another simplified side view of the computing device of FIG. 2, wherein the computing device is configured to utilize a shift next service option of the interval rationalization options, in accordance with an embodiment of the disclosure.
Figure 10:
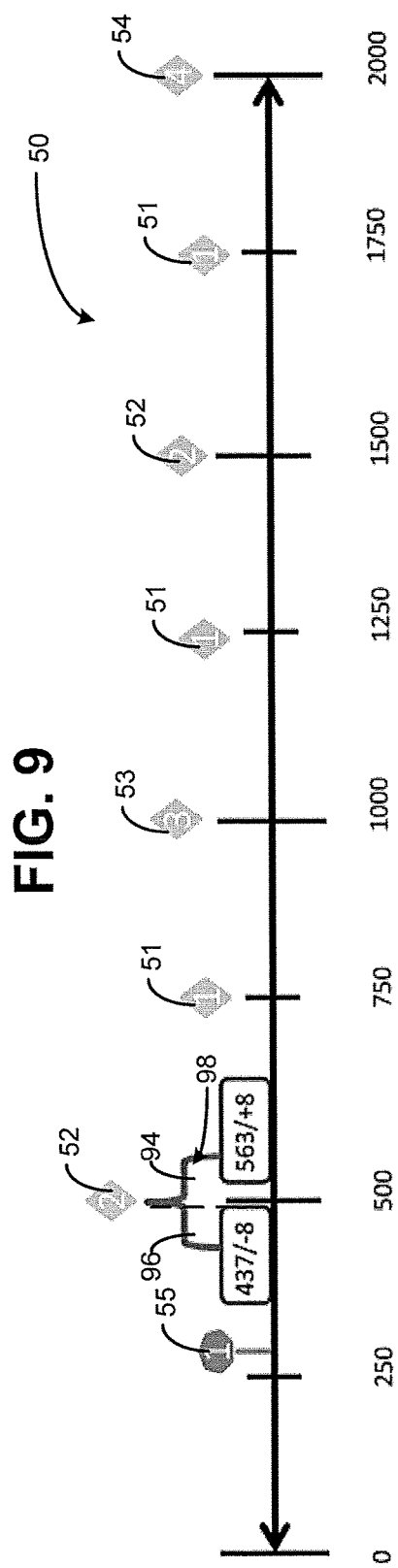
FIG. 10 is an example timeline for planned maintenance services for an earthmoving machine, wherein settings for the shift next service option are shown, in accordance with FIG. 3 and the present disclosure.

A simplified side view of the computing device 22 of FIG. 9 and the corresponding example timeline of FIG. 10 illustrate characteristics of the shift next service option 84. By utilizing the shift next service option 84, the operator 24 is able to shift a subsequent maintenance service 92 (e.g., the PM2 52, as shown) by either a forward shift 94 or a backward shift 96 within a time range 98. The time range 98, in which the subsequent maintenance service 62 may be shifted either forward or backward, may be based on a particular percentage of the time interval between maintenance services. In the given example, the interval between services is 250 working hours and the determined acceptable percentage for shifting is 25% of 250; therefore, the range is plus-or-minus 63 working hours of the originally set scheduled interval for the subsequent maintenance service 92. However, these quantities and percentages are merely exemplary and are certainly not limiting.

Figure 11:
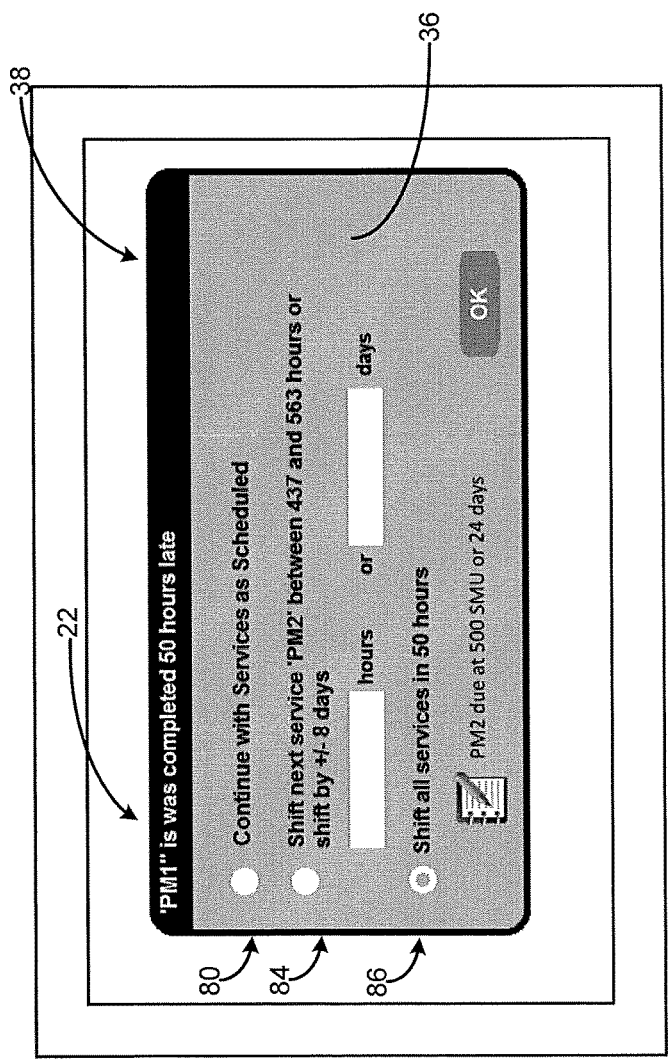
FIG. 11 is another simplified side view of the computing device of FIG. 2, wherein the computing device is configured to utilize a shift all service option of the interval rationalization options, in accordance with an embodiment of the disclosure.
Figure 12:
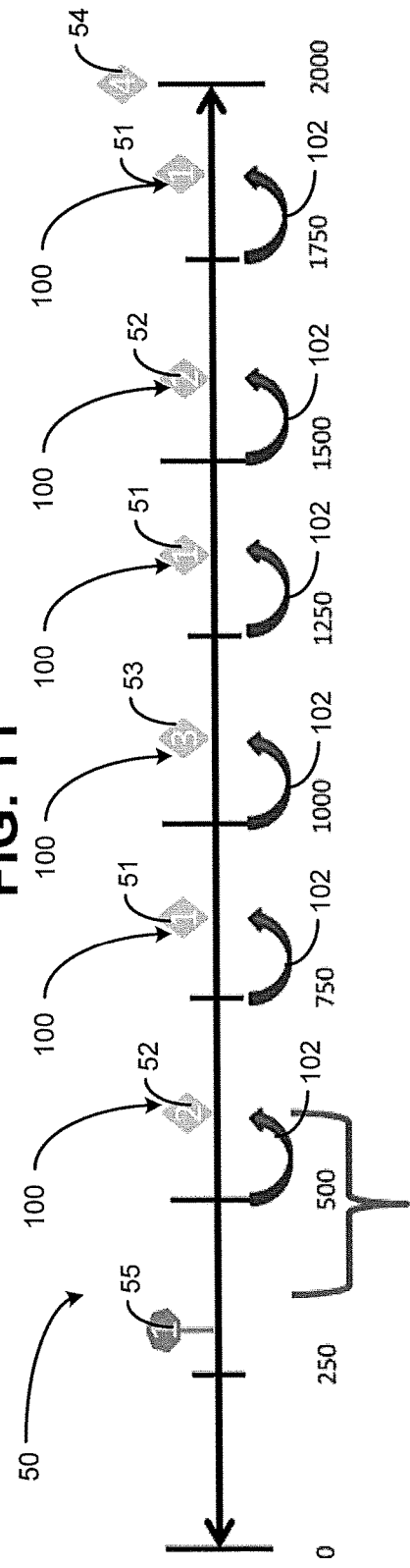
FIG. 12 is an example timeline for planned maintenance services for an earthmoving machine, wherein settings for the shift all service option are shown, in accordance with FIG. 11 and the present disclosure.
Figure 13:
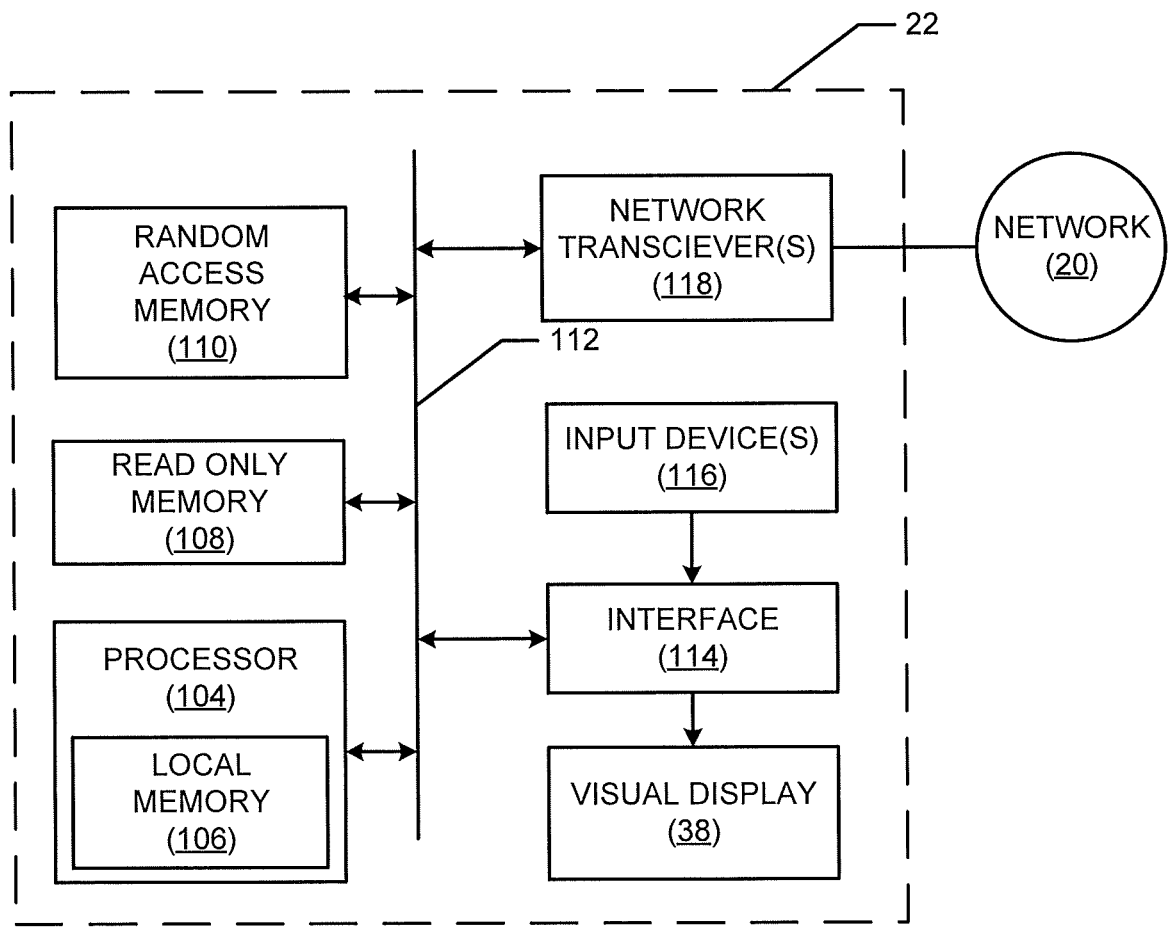
FIG. 13 is a schematic block diagram showing components of the computing device of FIGS. 1-12, in accordance with the present disclosure.

FIG. 11 shows another exemplary simplified side view of the computing device 22 and a corresponding example timeline of FIG. 12 to illustrate characteristics of the shift all service option 86. Using the shift all service option 86, all, or most of, the subsequent scheduled services 100 (e.g., all PM1s 51, PM2s 52, and PM3s 53, as shown) may be shifted backwards by a predetermined shift 102. The predetermined shift 102 may be shifted based on a specific time range like, for example, 25% of the working hour interval between services. However, in some examples, the PM4 54 may not be shifted when using the shift all services option 86, if the PM4 54 includes services vital to the enduring health of the earthmoving machine 14.

A combination of hardware and software may be used to implement instructions in association with the computing device 22 to provide the interval rationalization options to the operator 24. FIG. 4 is a block diagram of example components of the computing device 22 capable of executing instructions to realize the disclosed systems and methods for scheduling maintenance of the earthmoving machine 14 as described above in FIGS. 1-12 and/or capable of executing instructions to perform the methods discussed below in reference to FIG. 14. The computing device 22 may be, for example but not limited to, a mobile device, a tablet computer, a cellular phone, a laptop computer, a server, a personal computer, or any other type of computing device. The computing device 22 of the instant example includes a processor 104. For example, the processor 104 may be implemented by one or more microprocessors or controllers from any desired family or manufacturer.

The processor 104 includes a local memory 106 and is in communication with a main memory including a read only memory 108 and a random access memory 110 via a bus 112. The random access memory 110 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 108 may be implemented by a hard drive, flash memory and/or any other desired type of memory device.

The computing device 22 may also include an interface circuit 114. The interface circuit 114 may be implemented by any type of interface standard, such as, for example, an Ethernet interface, a universal serial bus (USB), and/or a PCI express interface. One or more input devices 116 are connected to the interface circuit 114. The input device(s) 116 permit a user to enter data and commands into the processor 104. The input device(s) 116 can be implemented by, for example, a keyboard, a mouse, a touchscreen, a track-pad, a trackball, and/or a voice recognition system. For example, the input device(s) 116 may include any wired or wireless device for providing input from the operator 24 to the computing device 22.

The visual display 38 is also connected to the interface circuit 114. The visual display 38 can be implemented by, for example, display devices for associated data (e.g., a liquid crystal display, a cathode ray tube display (CRT), etc.).

Further, the computing device 22 may include one or more network transceivers 118 for connecting to a network 20, such as the Internet, a WLAN, a LAN, a personal network, or any other network for connecting the computing device 22 to one or more other computers or network capable devices. As such, the computing device 22 may be embodied by a plurality of computing devices 22 for scheduling maintenance of the earthmoving machine 14.

As mentioned above the computing device 22 may be used to execute machine readable instructions. For example, the computing device 22 may execute machine readable instructions to perform the methods shown in the block diagram of FIG. 14 and described in more detail below. In such examples, the machine readable instructions comprise a program for execution by a processor such as the processor 104 shown in the example computing device 22. The program may be embodied in software stored on a tangible computer readable medium such as a CD-ROM, a floppy disk, a hard drive, a digital versatile disk (DVD), a Blu-ray disk, or a memory associated with the processor 104, but the entire program and/or parts thereof could alternatively be executed by a device other than the processor 104 and/or embodied in firmware or dedicated hardware. Further, although the example programs are described with reference to the flowchart illustrated in FIG. 14, many other methods of implementing embodiments of the present disclosure may alternatively be used. For example, the order of execution of the blocks may be changed, and/or some of the blocks described may be changed, eliminated, or combined.

INDUSTRIAL APPLICABILITY

In general, the present disclosure may find applicability in many industries, including, but not limited to, earthmoving machines and, more particularly, to systems and methods for scheduling maintenance services for earthmoving machines. By utilizing the systems and methods disclosed herein, a user or operator of an earthmoving machine will be provided greater flexibility in having planned maintenance services performed on his/her earthmoving machine. As most planned maintenance services are not performed in exact accordance with a planned maintenance schedule provided by a manufacturer, flexibility in scheduling may improve the customer's user experience with the earthmoving machine. Further, such systems and methods may be implemented as an application on computing devices that are already owned by the customer (e.g., a smart phone, a tablet computer, a laptop computer, etc.), providing a more convenient user experience.

Figure 14:
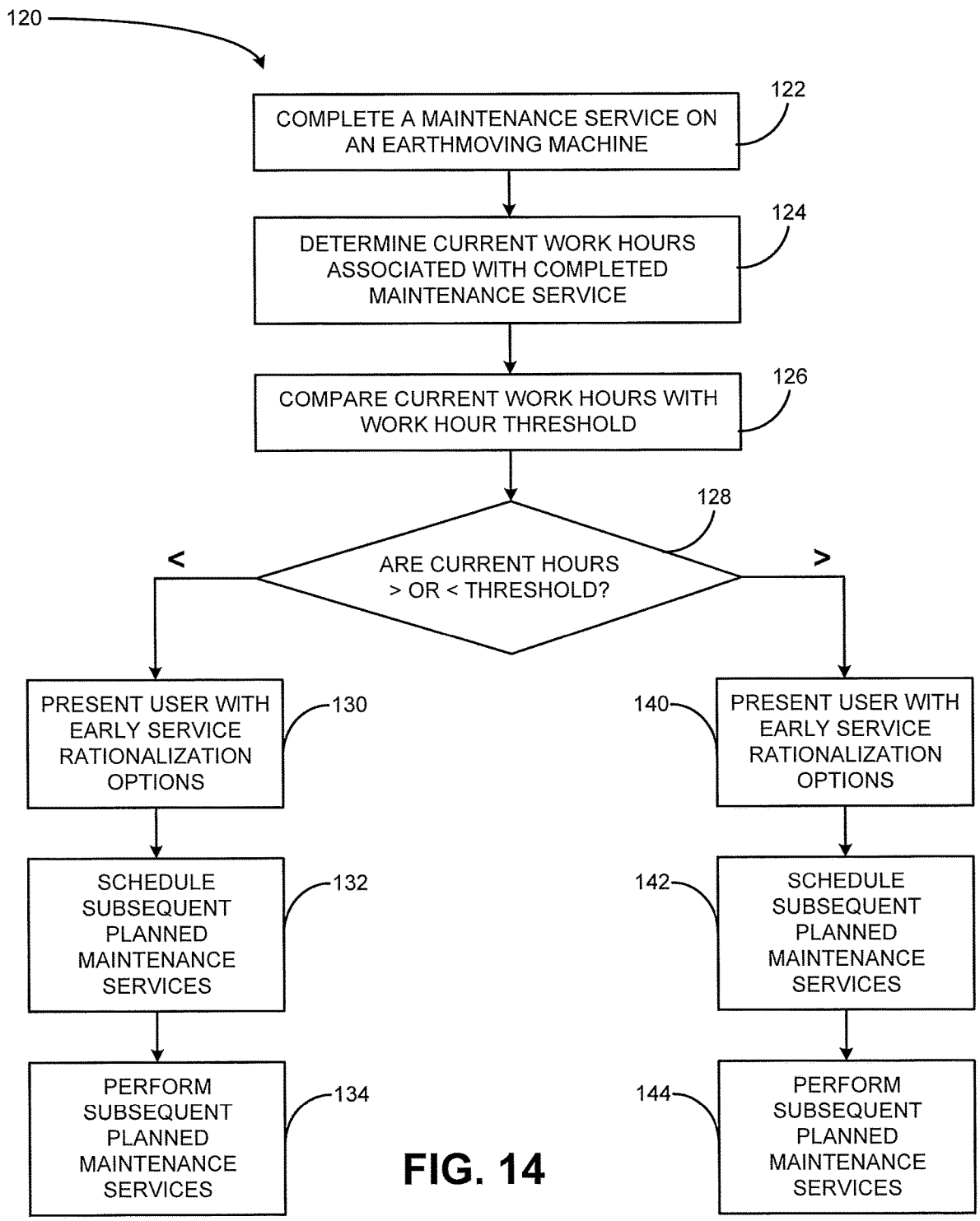
FIG. 14 is an example flowchart for a method for scheduling maintenance for an earthmoving machine, in accordance with another embodiment of the disclosure.

Turning now to FIG. 14, a flowchart for a method 120 for scheduling maintenance for an earthmoving machine is shown. The method may begin at block 122, when a planned maintenance service is completed on the earthmoving machine 14. Once the planned maintenance service is completed and, thusly, now is a "completed maintenance service," then current work hours associated with the completed maintenance service are determined, as shown in block 124. Thereafter, the current work hours for the earthmoving machine 14 are compared with a threshold associated with a first planned maintenance services (e.g., the number of hours at which the first PM1 51 is scheduled in the preplanned timeline 50), as shown in block 126. Using the results of such a comparison, it is determined if the current hours are greater than or less than the threshold hours, as shown in block 128.

If the current hours are less than the threshold, then the user is presented with the early service interval rationalization options 34, as shown in block 130. Such options may include, but are not limited to including, the continuation option 40, the service addition option 42, the shift next service option 44, and the shift all service option 46, all of which are described in greater detail above. Subsequent planned maintenance services for the earthmoving machine 14 may then be scheduled based on the use of the early service interval rationalization options 34, as shown in block 132. Then, the subsequent planned maintenance services may be performed on the earthmoving machine, as shown in block 134.

Alternatively, if the current hours are less than the threshold, then the user is presented with the late service interval rationalization options 36, as shown in block 140. Such options may include, but are not limited to including, the continuation option 80, the shift next service option 84, and the shift all service option 86, all of which are described in greater detail above. Subsequent planned maintenance services for the earthmoving machine 14 may then be scheduled based on the use of the early service interval rationalization options 34, as shown in block 142. Thereafter, the subsequent planned maintenance services may be performed on the earthmoving machine, as shown in block 144.

It will be appreciated that the present disclosure provides and systems and methods for scheduling maintenance services for earthmoving machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of updating a maintenance schedule for an earth-moving machine comprising:
   receiving, by an electronic maintenance control device and from a computing device that stores data regarding the earth-moving machine, the maintenance schedule;
   receiving, by the electronic maintenance control device and via a network, telematics data from a telematics system, of the earth-moving machine, that includes one or more sensors that track operation of the earth-moving machine;
   determining, by the electronic maintenance control device, that a maintenance service is completed according to the maintenance schedule;
   determining, by the electronic maintenance control device and based on the telematics data, current work hours associated with operation of the earth-moving machine and completion of the maintenance service;
   determining, by the electronic maintenance control device and after determining the current work hours, whether the current work hours satisfy a threshold number of hours;
   determining, by the electronic maintenance control device, to present a user interface that includes early service interval rationalization options based on the current work hours being less than the threshold number of hours,
      the early service interval rationalization options including an addition option to schedule an additional maintenance service within a time range,
      the time range being an amount of time between the completion of the maintenance service and a next scheduled maintenance service in the maintenance schedule, and
      the user interface including:
         an indication of the time range constraining the addition option,
         a first interactive user interface element for selecting the addition option, and
         a second interactive user interface element for specifying a time period, for the addition option, within the time range;
   providing, by the electronic maintenance control device and for display, the user interface based on determining to present the user interface;
   receiving, by the electronic maintenance control device, an indication of selection, within the user interface, of the first interactive user interface element for selecting the addition option; and
   altering, by the electronic maintenance control device, the maintenance schedule to include the additional maintenance service based on the indication of selection of the first interactive user interface element for selecting the addition option.

2. The method of claim 1, wherein altering the maintenance schedule comprises shifting one or more subsequent distinct maintenance events forward in time.

3. The method of claim 1, wherein altering the maintenance schedule comprises shifting one or more subsequent distinct maintenance events backward in time.

4. The method of claim 1,
   wherein the first interactive user interface element is a radio button, and
   wherein the second interactive user interface element is a text field.

5. The method of claim 1,
   wherein the time period is in a first type of units of time,
   wherein the user interface further includes:
      a third interactive user interface element for specifying a different time period for the addition option, and
   wherein the different time period is in a second type of units of time that is different from the first type of units of time.

6. The method of claim 1, wherein the user interface further includes:
   a third interactive user interface element for selecting a continuation option of the early service interval rationalization options; and
   a fourth interactive user interface element for selecting a different option of the early service interval rationalization options.

7. The method of claim 1,
wherein the user interface further includes one or more other interactive user interface elements for selecting different options of the early service interval rationalization options.

8. The method of claim 1,
wherein the user interface further includes a first button for submitting the indication of selection of the first interactive user interface element and information identifying the time period for the addition option.

9. The method of claim 1, further comprising:
determining different current work hours; and
providing, for display and based on the different current work hours, a different user interface for late service interval rationalization options that are different from the addition option.

10. The method of claim 1, wherein the threshold number of hours is a number of hours at which the maintenance service is scheduled in the maintenance schedule.

11. A non-transitory computer-readable storage medium storing one or more instructions that, when executed by a computer, cause the computer to:
receive, via a network, telematics data from a telematics system, of an earth-moving machine, that includes one or more sensors that track operation of the earth-moving machine;
determine that a maintenance service is completed according to a maintenance schedule received from a manufacturing database;
determine, based on the telematics data, current work hours associated with operation of the earth-moving machine and completion of the maintenance service;
determine, after determining the current work hours, whether the current work hours satisfy a threshold number of hours;
determine to present a user interface that includes early service interval rationalization options based on the current work hours being less than the threshold number of hours,
the early service interval rationalization options including an addition option to schedule an additional maintenance service within a time range,
the time range being an amount of time between the completion of the maintenance service and a next scheduled maintenance service in the maintenance schedule, and
the user interface including:
an indication of the time range constraining the addition option,
a first interactive user interface element for selecting the addition option, and
a second interactive user interface element for specifying a time period, for the addition option, within the time range;
provide, for display, the user interface based on determining to present the user interface;
receive an indication of selection, within the user interface, of the first interactive user interface element for selecting the addition option; and
alter the maintenance schedule to include the additional maintenance service based on the indication of selection of the first interactive user interface element for selecting the addition option.

12. The non-transitory computer-readable storage medium of claim 11, wherein the one or more instructions that cause the computer to alter the maintenance schedule cause the computer to shift one or more maintenance events forward in time.

13. The non-transitory computer-readable storage medium of claim 11, wherein the one or more instructions that cause the computer to alter the maintenance schedule cause the computer to shift one or more maintenance events backward in time.

14. The non-transitory computer-readable storage medium of claim 11, wherein the threshold number of hours is a number of hours at which the maintenance service is scheduled in the maintenance schedule.

15. A system, comprising:
a telematics system comprising one or more sensors configured to:
track operation of an earth-moving machine that includes the telematics system; and
provide, via a network, telematics data based on tracking the operation of the earth-moving machine; and
a computing device comprising:
one or more processors configured to:
receive, via the network, the telematics data;
determine that a maintenance service is completed according to a maintenance schedule received from a manufacturing database;
determine, based on the telematics data, current work hours associated with operation of the earth-moving machine and completion of the maintenance service;
determine, after determining the current work hours, whether the current work hours satisfy a threshold number of hours;
determine to present a user interface that includes early service interval rationalization options based on the current work hours being less than the threshold number of hours,
the early service interval rationalization options including an addition option to schedule an additional maintenance service within a time range,
the time range being an amount of time between the completion of the maintenance service and a next scheduled maintenance service in the maintenance schedule, and
the user interface including:
an indication of the time range constraining the addition option,
a first interactive user interface element for selecting the addition option, and
a second interactive user interface element for specifying a time period, for the addition option, within the time range;
provide, for display, the user interface based on determining to present the user interface;
receive an indication of selection, within the user interface, of the first interactive user interface element for selecting the addition option; and
alter the maintenance schedule to include the additional maintenance service based on the indication of selection of the first interactive user interface element for selecting the addition option.

16. The system of claim 15,
wherein the first user interface element comprises a radio button for selecting the addition option, and
wherein the second interactive user interface element comprises a text field for specifying the time period.

17. The system of claim 15, wherein the user interface further includes:

a third interactive user interface element for specifying a different time period for the addition option, wherein the time period is in a first type of units of time, and wherein the different time period is in a second type of units of time that is different from the first type of units of time.

18. The system of claim 15, wherein the user interface further includes:

one or more other interactive user interface elements for selecting different options of the early service interval rationalization options.

19. The system of claim 15, wherein the first user interface further includes:

a button for submitting a selection of the addition option and information identifying the time period for the addition option.

20. The system of claim 15, wherein the threshold number of hours is a number of hours at which the maintenance service is scheduled in the maintenance schedule.

\* \* \* \* \*